Jan. 8, 1924.

S. D. MERSHON

EDUCATIONAL APPLIANCE

Filed Sept. 17, 1921

WITNESSES

INVENTOR
SAMUEL D. MERSHON,
BY
ATTORNEYS

Jan. 8, 1924.
S. D. MERSHON
1,480,458
EDUCATIONAL APPLIANCE
Filed Sept. 17, 1921   2 Sheets-Sheet 2
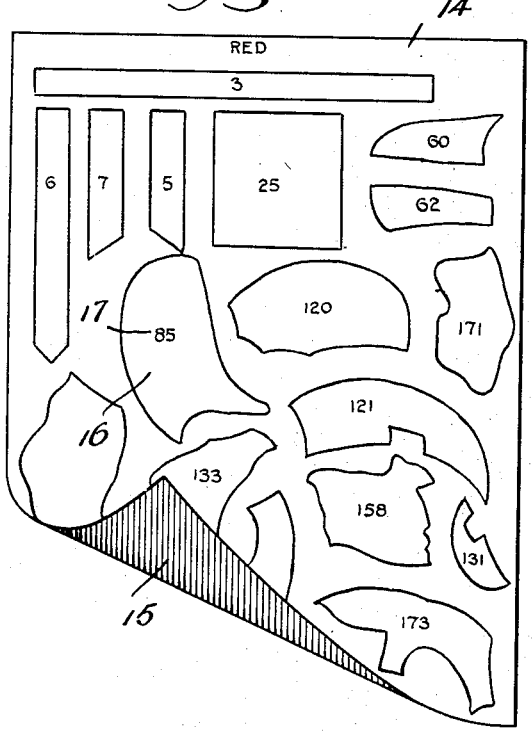
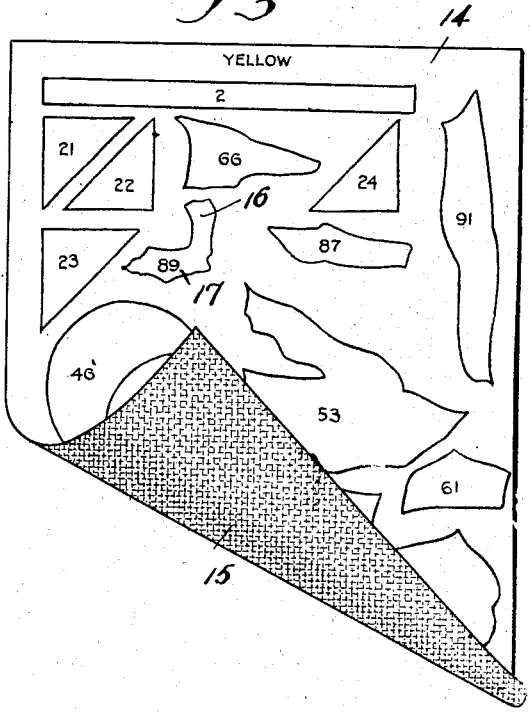
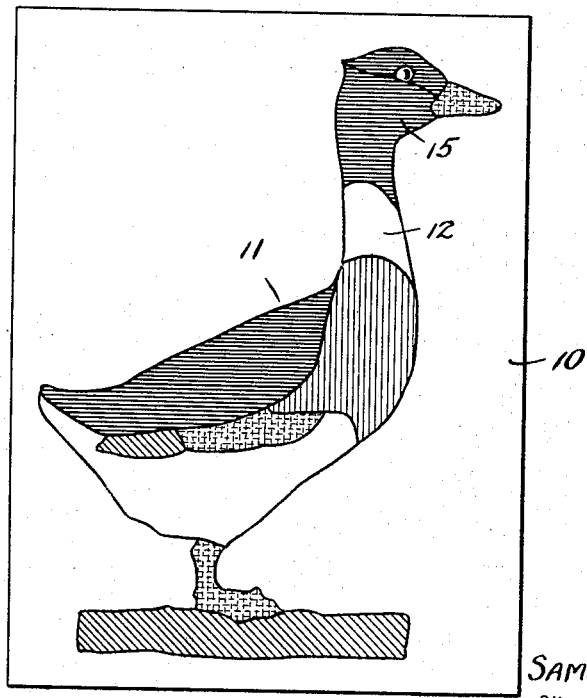
WITNESSES
INVENTOR
SAMUEL D. MERSHON,
BY
ATTORNEYS Patented Jan. 8, 1924.

1,480,458

UNITED STATES PATENT OFFICE.

SAMUEL D. MERSHON, OF RAHWAY, NEW JERSEY, ASSIGNOR OF ONE-FOURTH TO THEODORE G. AUGE, OF RAHWAY, NEW JERSEY.

EDUCATIONAL APPLIANCE.

Application filed September 17, 1921. Serial No. 501,432.

*To all whom it may concern:*

Be it known that I, SAMUEL D. MERSHON, a citizen of the United States, and a resident of Rahway, in the county of Union and State of New Jersey, have invented a new and Improved Educational Appliance, of which the following is a description.

The present invention has relation and refers particularly to educational appliances for children and the same contemplates an instrumentality for the production of a pictorial representation of certain objects, geometrical figures, scenes, or the like.

The common form of educational appliances of this character generally includes a sheet having an outlined object or the like and a separate sheet upon which the object is printed, or lithographed in colors which the child employs as a pattern for coloring the sheet upon which the outlined object is arranged by means of crayons or paints. Under this scheme the copy which the child produces is so far inferior to the printed pattern that he is more or less discouraged by his inability to imitate the same.

It is therefore an object of the present invention to provide a highly amusing and attractive instrumentality which trains the child to produce a finished pictorial representation that will satisfy his inherent desire to create a clear reproduction of the object intended.

A further object in view resides in the provision of a means for producing objects, geometrical figures, scenes, or the like, in colors, which means requires a certain element of skill both in the cutting out of the colored sheets employed and the proper arrangement of the cut-out colored areas on the outlined and sub-divided areas of the outlined object.

With the above recited and other objects in view the invention resides in the novel combination and arrangement of elements set forth in the following specification, particularly pointed out in the appended claim, and illustrated in the accompanying drawings, it being understood that variations and modifications thereof which properly fall in the scope of the appended claim, may be resorted to when found expedient.

In the drawings—

Figures 2, 3, 4 and 5 illustrate the sheets of various colors or shades upon one side of which outlined areas are arranged to be cut therefrom and applied to the first sheet;

Figure 6 illustrates the first sheet with the cut-out areas applied to the outlined object, to complete the same in colors.

Figure 1:
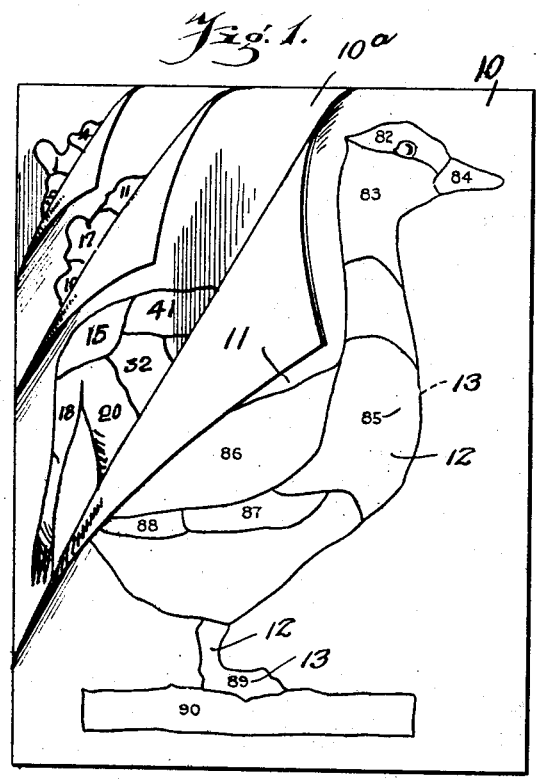
Figure 1 represents a plurality of sheets upon which outlined objects, geometrical figures, or the like, are arranged.
Figure 2:
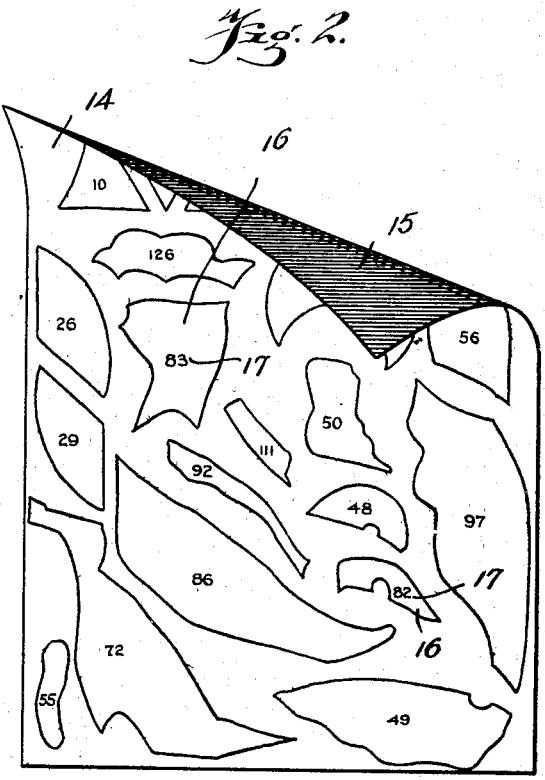
Figure 3:
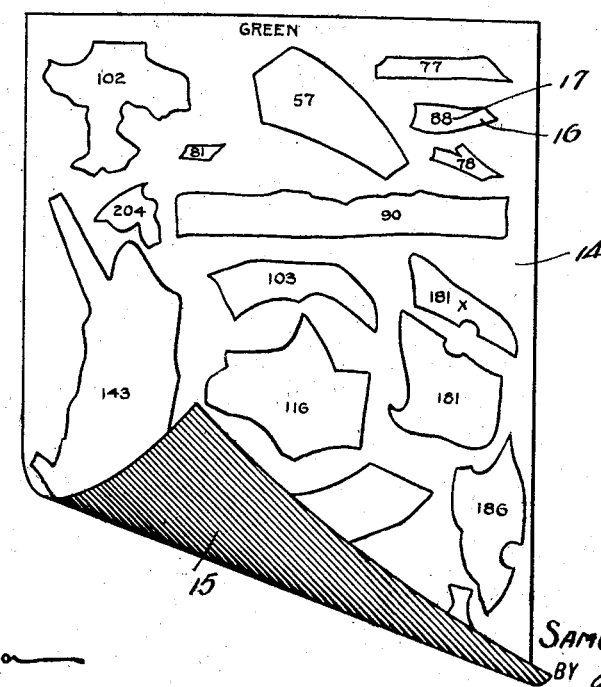

Referring to the drawings by characters of reference, 10 designates a sheet upon which an object 11 is outlined by printing or otherwise inscribing the same thereon. The object, as illustrated, is sub-divided into a number of outlined areas 12, certain of which are designated by suitable characters 13 for a purpose to be hereinafter set forth. In addition to the sheet 10 a plurality of sheets 14 are employed which are preferably colored or tinted on one side as at 15 and provided on the opposite side with outlined areas 16, said areas being designated by the characters 17.

In use, the outlined areas 16 of the sheets 14 are cut out and said areas are selected according to the indicia 17 thereon to correspond to the outlined areas 12 of the sheet 10. The child then applies said corresponding areas thereto with the colored side out, thereby completing the outlined object 11 in colors on the sheet 10. It is, of course, understood that certain of the outlined areas on the sheet 10 may be left uncovered or, if desired, all of said areas may be covered depending on the nature of the object to be produced. In practice, a number of sheets having various objects will be employed, for 10, 10$^a$, 10$^b$, and 10$^c$ being shown, and the said sheets will preferably be arranged in book form with the colored cut-out sheets 14, thereby producing a complete article of manufacture which may be sold in its entirety. It will be seen that the sub-divisions of the several sheets 14 correspond in number with the areas of the objects on the several sheets 10, 10$^a$, 10$^b$, and 10$^c$, and that the subdivisions are promiscuously arranged on said sheets, with some of the sub-divisions for each object on each sheet. By this means the selecting of the proper sub-division for the object is rendered more difficult and the interest in the game increased.

Having thus described my invention, I claim:

An educational appliance, comprising a plurality of sheets each having the representation of an object intended to be multicolored, each object being sub-divided by outlined areas, and a plurality of sheets each having one side colored in a single color, the colors of the sheets being different, the other sides of the sheets being each provided with outlined sub-divisions, the sub-divisions of the several sheets corresponding in number with the areas of the several objects on the first sheets, said sub-divisions being adapted to be cut out and applied to the areas of the several objects of the first sheets to effect the multi-coloring of said objects.

SAMUEL D. MERSHON.